Figure 1:
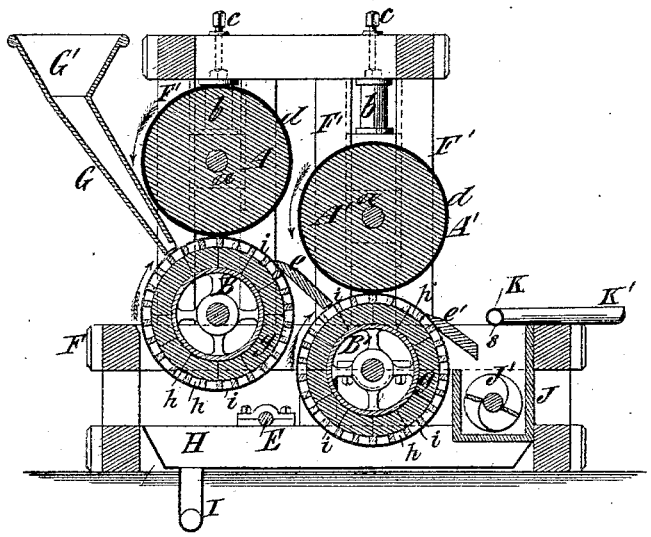

(No Model.)

P. H. GRIMM.
ART OF TREATING AND UTILIZING THE REFUSE OR WASTE PRODUCTS RESULTING FROM STARCH MANUFACTURE.

No. 303,930. Patented Aug. 19, 1884.

Witnesses:—
C. J. Sundgren
Ed. L. Moran

Inventor:—
Paul H. Grimm
by his Attorneys
Brown & Hall

UNITED STATES PATENT OFFICE.

PAUL H. GRIMM, OF GLEN COVE, NEW YORK, ASSIGNOR TO THE GLEN COVE MANUFACTURING COMPANY, OF SAME PLACE.

ART OF TREATING AND UTILIZING THE REFUSE OR WASTE PRODUCTS RESULTING FROM STARCH-MANUFACTURE.

SPECIFICATION forming part of Letters Patent No. 303,930, dated August 19, 1884.

Application filed December 31, 1883. (No model.)

*To all whom it may concern:*

Be it known that I, PAUL H. GRIMM, of Glen Cove, in the county of Queens and State of New York, have invented certain new and useful Improvements in the Art of Treating and Utilizing the Refuse or Waste Products Resulting from Starch-Manufacture, of which the following, in connection with the accompanying drawings, is a full, clear, and exact specification and description.

In the manufacture of starch from Indian corn by what is known as the "sweet" or "alkaline" method the grain is ground or crushed while in a wet condition, and is then conveyed to a sieve, which separates the fine from the coarse particles. The finer portions of the ground corn, consisting of starch, gluten, and other nitrogenous substances, are washed through the meshes of the sieve with water, and constitute what is known as the "starch-milk." The coarser portions of the ground corn, consisting, mainly, of the husks and germs of the kernels of grain, and containing no alkali, pass over the sieve, and are carried away as a waste or refuse product, to be used for animal-food. The starch-milk, holding starch, gluten, &c., in liquid suspension, is subjected to subsequent operations, (one of which is the addition of alkali,) by which the starch is deposited and separated from the gluten and other waste nitrogenous matter. The spent starch-liquor, holding in solution or suspension chiefly gluten, is also a waste or refuse product of starch-manufacture proper, and for convenience in this specification I shall term this spent liquor "gluten-water," "fine refuse," or "waste nitrogenous matter." The gluten and other waste matter, when recovered from the gluten-water, owing to their nitrogenous properties, constitute a valuable food for animals, and especially is this so when they are combined with the coarse husky portions of the corn which pass as waste from the sieve, as above described.

The most common method heretofore practiced for recovering the gluten or fine refuse, and at the same time for combining these waste substances with the coarse husky refuse, has been to throw the coarse refuse, saturated with water after sieving, into leaching bins or tubs, and then to run the gluten-water upon it, the coarse refuse acting as a filter-bed and catching and retaining the gluten and solid nitrogenous materials. These leaching-bins are usually lined with burlaps or wire-cloth, and a layer of the coarse refuse being thrown in, the gluten-water is allowed to flow upon it for a time, when another layer of coarse refuse is added, and the gluten-water flows upon this also, and so on until the bin or tub is full. During this operation the water contained in the coarse refuse and the liquid part of the gluten-water filters through, leaving the coarse refuse mixed with the fine refuse in a more or less moist condition. In this state the contents of the bin are ready for market, and are shoveled out and sold, the operation of shoveling and breaking down serving still more intimately to mix the coarse refuse with the fine refuse recovered from the gluten-water. The coarse and fine refuse or gluten-water have also been mixed together before and while entering the leaching-bin, where the water was allowed to drain off the mingled mass; but this method, while thoroughly mixing the coarse and fine refuse, was found to be no more efficient than when the gluten-water was run upon successive layers of the coarse refuse, and the mass was then allowed to drain. The difficulties in thus treating in leaching-bins the coarse refuse with the fine refuse contained in the gluten-water have been the length of time required in leaching, the inability of the coarse refuse, owing to its being already saturated with water, to readily act as an absorbent or filter for the gluten-water, the too moist condition in which the product has been left in the leaching-bin when marketable, and the want of a thorough mixture of the mass, so as to combine homogeneously all the nutritious substances contained in it.

The object of my invention is more economically, quickly, and efficiently to save the gluten and other nitrogenous matter contained in the spent starch-liquor, and, while saving the coarse husky refuse, to so combine the fine glutinous refuse with it as to make an animal-food comprising all the nutritious properties contained in the waste materials from corn in starch-manufacture, and to treat this coarse and fine refuse mixed together so as to make a more marketable product. I have discovered that in order more efficiently to reclaim the fine refuse contained in the gluten-water or spent starch-liquor, and to thoroughly mix and commingle it with the coarse husky refuse, it is advantageous to first bring the coarse refuse to such a dry condition by pressure, as herein set forth, that it can readily absorb and take up the gluten-water, and to then add the gluten-water to this comparatively dry coarse refuse in such a manner as to recover the solid particles in the gluten-water, and to secure a homogeneous mixing of the whole mass of coarse and fine refuse. The mixture thus formed may or may not be subjected to drainage or leaching, as heretofore practiced, and as above described.

My invention includes a method of subjecting the coarse husky refuse to pressure, so as to free it from water, and in subsequently adding gluten-water to the comparatively dry coarse refuse after pressure has been removed, and while the mass of coarse and fine refuse is in a free state.

My invention also includes an improvement in subsequently sieving the water expressed from the coarse refuse, in order to extract therefrom the finer particles of refuse which may have escaped with the water, and in afterward adding the fine refuse retained by the sieve to the pressed substance.

My invention also includes the combination, with an apparatus for expressing water from the refuse, of a conveyer whereby the pressed refuse is moved continuously away from said apparatus, and means for delivering the gluten-water upon the pressed refuse while it is under the action of the conveyer, so that the conveyer is made to serve the double purpose of removing the pressed refuse from the expressing apparatus and of mixing the gluten-water with the coarse refuse. By such a combination of mechanism I obtain the coarse and fine refuse of a uniformly nutritious quality, and the process is continuous and not intermittent.

My invention also includes, in combination with an apparatus for expressing the water from the coarse refuse and the sieving of this water, the conveying and mixing with the coarse pressed refuse of the gluten-water, and the settling and concentrating of the glutinous and nitrogenous substances in the spent starch-liquor or gluten-water, so as to free them from a large share of the water in which they are usually held in suspension when separated from the starch.

In order that my invention may be understood, I have represented in the accompanying drawings the apparatus which may be advantageously employed in carrying out my improved method, and which embodies my novel combination of mechanical parts and the successive steps in the process used by me in treating the coarse and fine refuse from starch-manufacture. This apparatus, so far as its elements for expressing water are concerned, is similar to that shown in my application for Letters Patent filed December 31, 1883, and in Letters Patent No. 296,000, dated April 1, 1884, issued to me.

Figure 2:
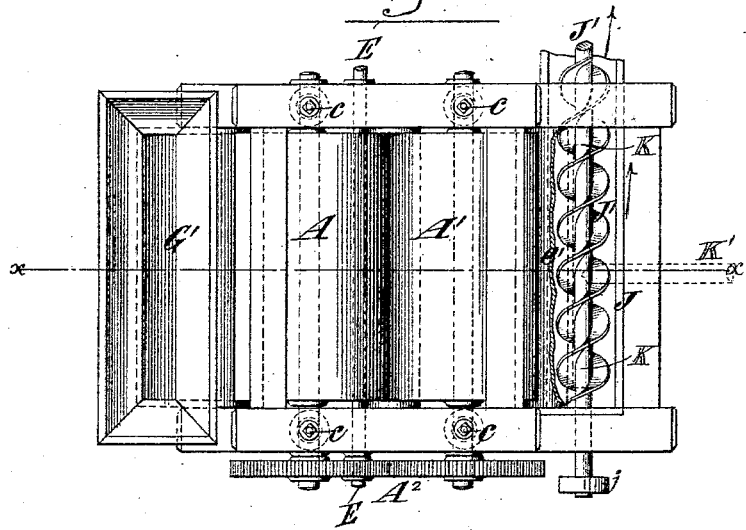

Figure 1 is a vertical section of said apparatus, and Fig. 2 is a plan of the same.

Similar letters of reference designate corresponding parts in both figures.

The coarse husky refuse, as it leaves the sieve after grinding, being largely composed of water, is subjected to pressure between one or more pairs of rolls, two pairs being here shown.

A A' designate the upper rolls of the two pairs, and B B' designate the two lower rolls. These rolls all receive rotary motion by suitable gearing, A², from a driving-shaft, E, as is shown and described in my aforesaid application and patent, whereby they are caused to turn in the direction indicated by the arrows in Fig. 1. The bearings of the lower rolls, B B', are fixed in a suitable base-frame, F, and the bearings of the upper rolls, A A', are movable vertically between uprights F', by which they are guided. Springs C, of rubber or other material, are employed to produce the desired pressure between the rolls of the two pairs, and the tension or pressure exerted by these springs may be regulated by screws $c$ in a well-understood manner. The upper rolls, A A', may be of any desired construction, and may be covered or faced with india-rubber $d$, to enable them to operate more effectively on the substance presented to them. The coarse wet refuse or mingled refuse and water is delivered by a chute, G, from a hopper, G', upon the lower roll, B, as near as possible to its point of contact with the roll A, and by the pressure exerted by the said rolls is freed from a large part of its water. It is removed by a scraper or inclined board, $e$, from the roll B, and is delivered onto the roll B', and by the pressure of the rolls A' B' more water is expressed. The comparatively dry refuse is delivered from the roll B' by a scraper or board, $c'$, and falls into a trough, J, in which is arranged a screw-conveyer, J'. The conveyer J', by means of a belt passing around a pulley, $j$, or otherwise, is rotated in a direction to move the pressed refuse through the trough J in the direction of the arrow in Fig. 2, and thus delivers the pressed refuse continuously from the apparatus.

In order to afford a free avenue of escape for the water expressed by the rolls, the lower rolls, B B', have formed in their bodies $g$ gutters or channels $h$, and are covered with wire-cloth or other reticulated or perforated metal or material $i$, as is shown in my aforesaid application. Below the rolls is a pan, H, for water, from which extends an outlet-pipe, I. The water expressed from the coarse refuse, and received in the pan, and passing out by the pipe I, necessarily carries with it some solid material or refuse in small particles, such as can pass through the meshes of the roll-coverings. The small particles of refuse, consisting of starch, gluten, the husks of the grain, &c., thus carried off are recovered by passing the liquid containing these waste particles over a fine sieve or separator, and the portions retained by the sieve are returned and mixed in with the coarse pressed refuse to be used as animal-food, while the spent liquid which passes through the sieve or separator may be treated in any known or suitable manner for the recovery of any starch or valuable substance that may be contained therein.

When delivered into the conveyer-trough J, the coarse refuse, after being pressed, is in a condition to readily absorb moisture, being in a comparatively dry state, and while it is under the action of the conveyer J', and not under pressure, and in a free state, I deliver upon it the spent starch-liquor or gluten-water containing the fine refuse by means of a pipe, K, or other means. By the action of the conveyer all the coarse husky refuse is exposed to the gluten-water, which is readily absorbed, and thus I obtain an intimate mixture of the fine particles in the gluten-water with the coarse refuse, the latter taking up and retaining all the fine refuse or solid matter in the gluten-water, giving this mixture of coarse and fine refuse a uniformly nutritious quality.

I find after the coarse husky refuse has been once brought to a state of comparative dryness by pressure, as described, that while it will retain the solid matter contained in the gluten-water, it will also readily allow the liquid or watery portions to drain off. The pipe K may extend lengthwise of and above the conveyer-trough J, and in its under side have a slit or opening, s, through which the gluten-water escapes upon the coarse pressed refuse. The gluten-water is supplied to the pipe K by a pipe, K', from any suitable source. The pipes K K' are shown dotted in Fig. 2, so as not to obstruct a view of the conveyer J.

In starch-manufacture by the sweet or alkaline method, two well-known processes are in use for separating the starch from the starch-milk. By one, which is usually denominated the "siphoning process," the starch is deposited in vats or cisterns, and by the other the starch is deposited upon planes or tables. By both these processes, after the starch has deposited, the spent starch-liquor, containing gluten and nitrogenous matter, is left as a residuum, of which the water constitutes a large part.

I have discovered that, in combination with the apparatus above described, and for the purposes of my invention, it is advantageous to allow this spent starch-liquor, whether from depositing-planes or from vats or cisterns employed in the siphoning process, to remain in receptacles a sufficient length of time for the gluten or nitrogenous matter to settle at the bottom, as hitherto practiced. I then draw off the supernatant water in the usual manner, leaving the gluten and fine refuse in a concentrated slimy mass, and it is this I term "gluten-water" or "fine refuse," which I mix with the coarse pressed refuse in the conveyer, as described. The gluten or fine nitrogenous substances will readily separate from the spent starch-liquor and settle, as indicated. By drawing off so large a proportion of the water after settling, the coarse pressed refuse can easily absorb and assimilate the fine glutinous refuse remaining, which it could not do if all the spent starch-liquor, without concentrating the gluten and fine refuse, were run into the conveyer with the coarse refuse.

In practicing the process herein described I do not find it necessary to neutralize the alkaline spent starch-liquor or gluten-water with acid, for by settling and concentrating the gluten and nitrogenous matter in the manner mentioned the supernatant water which is drawn off carries with it in solution so large a proportion of the alkali that what remains in the fine glutinous refuse is not only not deleterious, but, on the contrary, is beneficial in preventing the coarse and fine refuse, when mixed, from fermenting. I find, also, that the coarse pressed refuse contains sufficient natural acid to nearly or quite neutralize the alkali in the gluten-water or fine refuse. If it be desired to still further free the concentrated gluten-water from alkali, water may be added to it, and the mass again permitted to settle, and the supernatant water again drawn off, which operation may be repeated as often as deemed best.

It is not essential in my invention, although I have found it desirable, to sieve the water which passes through the meshes of the rolls from the coarse refuse, as described, for the rolls may work so efficiently that so small a quantity of refuse material will pass through them as not to render the sieving profitable. This sieving of the water from the coarse refuse, it will be observed, is a separate and distinct operation from that performed in separating the coarse husky matter of the grain from the starch-milk immediately after grinding.

I do not confine my invention to the sweet or alkaline process or to any process rendering it necessary that the starch should be deposited in vats or cisterns or upon planes or tables. It may with equal advantage be used in treating the coarse and fine refuse substantially as described in the sour or fermenting process of starch-making, and also where centrifugal machines or other appliances are used for separating the starch from the coarse and fine refuse.

Being aware that for many years it has been customary in starch-manufacture to recover and mingle in a more or less thorough manner the coarse husky refuse and the fine matter of the grain from the spent starch-liquor for use as animal-food, I do not claim this mixture or compound of coarse and fine refuse, whether in a wet, dry, or baked condition, as a part of my invention. Knowing also that it has been proposed to recover the fine slimy or glutinous matter from spent starch-liquor by filtering this liquor through the coarse husky matter of the grain while said coarse husky matter is under pressure, I do not claim such method as of my invention; and my method differs from that last above referred to, in that I add the gluten-water or spent starch-liquor to the coarse husky refuse after pressure has been removed and while the coarse as well as the fine refuse is in a free state. My method also differs from the last-mentioned method, in that I do not first express the water from the fine refuse and then mix it with the coarse, but first express the water from the coarse refuse and then mix it with the fine refuse while the latter is in a fluid or semi-fluid state. It has been also proposed to first mix the coarse wet refuse as it comes from the sieve separation with the spent starch-liquor or fine refuse before the extraction from either of the water contained in them, and which is claimed to act as a vehicle to facilitate the intermingling of the particles, and the water is then drained from the semi-fluid mass after the mixture has been effected. I do not claim this method as of my invention.

What I claim as my invention, and desire to secure by Letters Patent, is—

1. The improvement in the method of treating the refuse from starch-manufacture, consisting in subjecting the coarse wet refuse to pressure in order to free it from water, and in subsequently adding to this pressed refuse the fine glutinous or nitrogenous residuum or refuse contained in spent starch-liquor, this addition of fine refuse being made after pressure has been removed and while the coarse and fine refuse are in a free state, substantially as and for the purpose herein described.

2. The improvement in treating the coarse wet refuse of the grain when separated from the starch-milk, consisting in subjecting this coarse wet refuse to pressure to free it from water, and subsequently sieving this expressed water to extract therefrom any fine refuse matter remaining therein, and in adding this sieved refuse matter to the coarse pressed refuse, substantially as and for the purpose herein described.

3. The combination, with an apparatus for expressing water from starch-refuse, of a conveyer for moving the pressed refuse from said apparatus, and means for delivering spent starch-liquor or gluten-water upon the refuse while it is under the action of the conveyer, and for the homogeneous mixing of the contents being so conveyed, substantially as and for the purpose herein described.

4. The improvement in the method of treating spent starch-liquor by settling or concentrating the fine glutinous or nitrogenous materials contained therein, and the freeing these substances of a large part of the water in which they are usually held in suspension when separated from the starch, and in subsequently adding them to the coarse pressed refuse, substantially as and for the purpose herein described.

5. The improvement in the method of treating spent starch-liquor by allowing the fine glutinous or nitrogenous matter contained therein to settle or concentrate, and by drawing off the supernatant water to thus free these substances of a large part of the alkali usually contained with them in the spent starch-liquor, so as to make them more suitable for animal-food when mixed with the coarse starch-refuse, substantially as and for the purpose herein described.

6. The improvement in the method of treating the residuum or refuse from starch-manufacture, including the expressing the water from the coarse husky refuse by suitable apparatus, the sieving of the water so expressed and the recovery therefrom of any fine refuse matter which may have escaped during the expressing operation, the settling and concentrating of the fine glutinous or nitrogenous materials contained in the spent starch-liquor and the freeing them from a large part of the water and alkali with which they are usually held in suspension, the addition of this concentrated fine glutinous refuse, as well as the fine refuse recovered by sieving the water from the expressing apparatus, to the coarse pressed refuse, and the thorough mixing and mingling of the whole mass of coarse and fine refuse, substantially as and for the purpose herein described.

PAUL H. GRIMM.

Witnesses:
 FREDK. HAYNES,
 ED. L. MORAN.